US012737387B2

(12) United States Patent
Kulkarni et al.

(10) Patent No.: US 12,737,387 B2
(45) Date of Patent: Sep. 15, 2026

(54) INTELLIGENT TRANSACTION ANALYTICS

(71) Applicant: KPMG International Services Ltd, London (GB)

(72) Inventors: Santosh Kumar Kulkarni, Atlanta, GA (US); Michael Woodford, Philadelphia, PA (US); Kallol K Ghosh, Atlanta, GA (US); Scott Asher, Atlanta, GA (US)

(73) Assignee: KPMG International Services Ltd., London (GB)

( * ) Notice: Subject to any disclaimer, the term of this patent is extended or adjusted under 35 U.S.C. 154(b) by 0 days.

(21) Appl. No.: 18/788,304

(22) Filed: Jul. 30, 2024

(65) Prior Publication Data

US 2025/0045303 A1 Feb. 6, 2025

Related U.S. Application Data

(60) Provisional application No. 63/517,187, filed on Aug. 2, 2023.

(51) Int. Cl.
*G06F 16/28* (2019.01)

(52) U.S. Cl.
CPC .................................. *G06F 16/287* (2019.01)

(58) Field of Classification Search
CPC ..................................................... G06F 16/287
See application file for complete search history.

(56) References Cited

U.S. PATENT DOCUMENTS

| | | | | |
|---|---|---|---|---|
| 7,398,244 | B1 * | 7/2008 | Keith | G06Q 40/06 705/37 |
| 2019/0066052 | A1 * | 2/2019 | Boutros | G06F 16/248 |
| 2019/0318031 | A1 * | 10/2019 | Sim | G06F 16/287 |
| 2020/0310599 | A1 * | 10/2020 | Mukherjee | G06F 3/0484 |
| 2020/0341903 | A1 * | 10/2020 | Dobiesz | G06F 9/451 |
| 2022/0207085 | A1 * | 6/2022 | Mantin | G06N 3/08 |
| 2022/0269701 | A1 * | 8/2022 | Yu | G06F 16/288 |
| 2022/0342911 | A1 * | 10/2022 | Dhir | G06F 16/2386 |

* cited by examiner

*Primary Examiner* — Tony Wu

(57) ABSTRACT

Systems and methods disclosed herein provide for classification of business transactions. A client device runs an application that receives identification of a dataset for use in a classification analysis, where the dataset including a plurality of transactions. The application then receives user inputs to create a new analysis and runs a classification analysis of the transactions using one or more of manual classification, rules-based classification, and a machine learning model.

7 Claims, 6 Drawing Sheets

INTELLIGENT TRANSACTION ANALYTICS

CROSS-REFERENCE TO RELATED APPLICATIONS

This application claims the benefit of U.S. Provisional Application No. 63/517,187 filed Aug. 2, 2023.

FIELD OF USE

Aspects described herein generally relate to transaction categorization for use in tax analyses, and hardware and software related thereto. More specifically, one or more aspects describe herein improve transaction categorization by using one or more categorization methods including manual categorization, rules-based processing, and an artificial intelligence model trained using transactional data.

BACKGROUND OF THE INVENTION

Business transactions may be categorized using, for example, an accountant or accounting software. A transaction may be categorized differently based on various criteria. As an example, a law firm paying for another law firm's services may be categorized differently than an import/exporter paying for a law firm's services. As another example, a marketing company's transactions related to marketing services are likely to be normal operating costs rather than advertising expenses. The type of transaction and entity performing the transaction can affect the tax impact of a given transaction, making accuracy paramount.

SUMMARY OF THE INVENTION

The following presents a simplified summary of various aspects described herein. This summary is not an extensive overview and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to one aspect, a computer-implemented method for classification of business transactions is performed by or within an application on a client device. The method includes receiving identification of a dataset for use in a classification analysis, where the dataset including a plurality of transactions. The method also includes receiving user inputs to create a new analysis and classifying the transactions using one or more of manual classification, rules-based classification, and an artificial intelligence (AI) model.

According to another aspect, an apparatus for classification of business transactions includes one or more processors and a memory storing instructions that, when executed by the one or more processors, cause the apparatus to perform the following. First, via an application operating on the one or more processors, the apparatus receives identification of a dataset for use in a classification analysis, where the dataset including a plurality of transactions. Then the apparatus receives user inputs to create a new analysis and classifies the transactions using one or more of manual classification, rules-based classification, and an AI model.

According to another aspect, a non-transitory machine-readable medium stores instructions that, when executed by one or more processors, cause the one or more processors to perform the following steps. First, an application at a client device and, via the application, receive identification of a dataset for use in a classification analysis, where the dataset including a plurality of transactions. Then the instructions cause the processors operating the application to receive inputs to create a new analysis and to classify the transactions using one or more of manual classification, rules-based classification, and an AI model.

BRIEF DESCRIPTION OF DRAWINGS

The present disclosure is described by way of example and not limited in the accompanying figures in which like reference numerals indicate similar elements and in which.

DETAILED DESCRIPTION OF THE INVENTION

Figure 1:
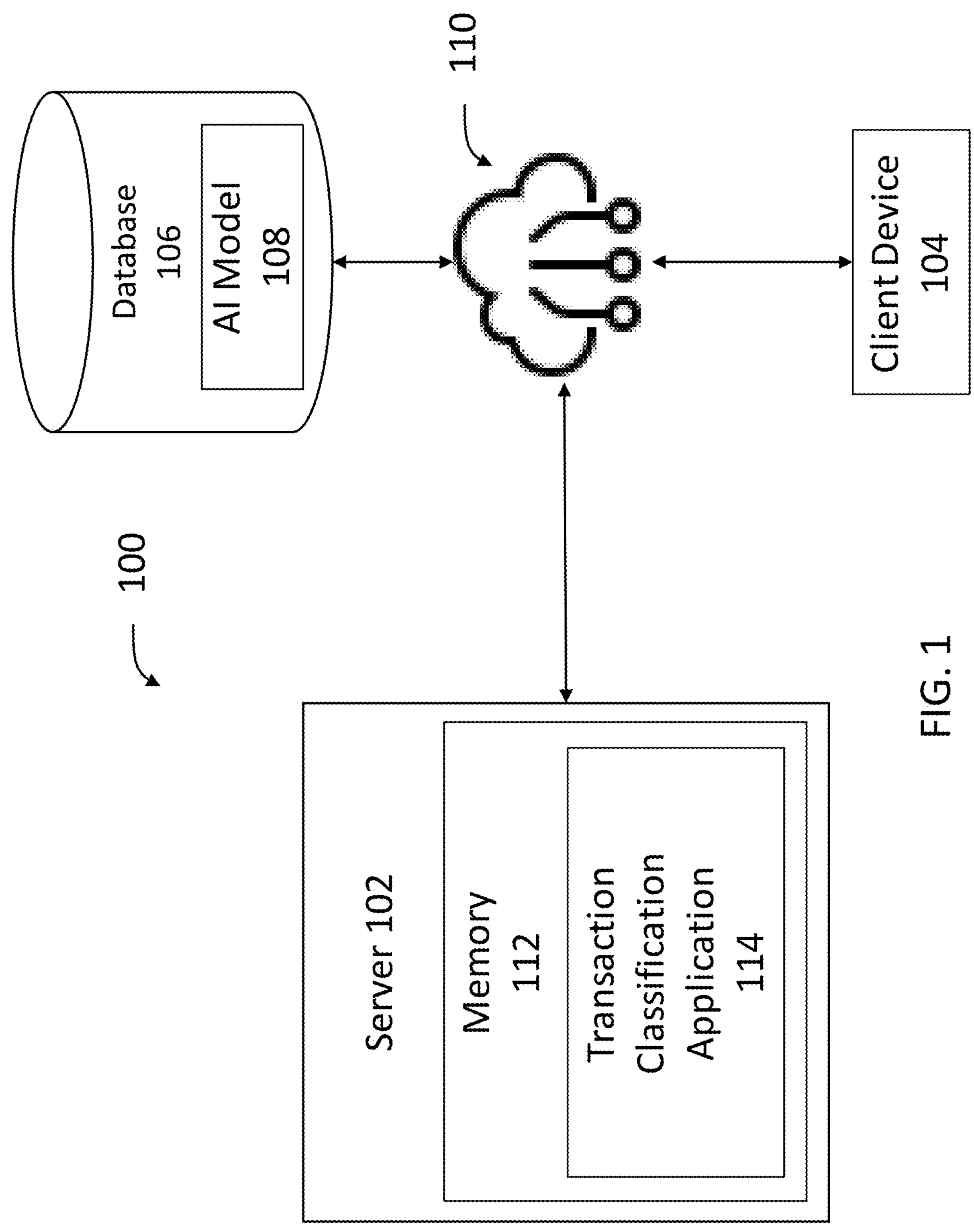
FIG. 1 is a block diagram of a system for leveraging one or more of manual classification, rules-based classification, or artificial intelligence (AI) based classification for transaction categorization.

In the following description of embodiments of the invention, reference is made to the accompanying drawings, which show by way of illustration embodiments in which aspects of the disclosure may be practiced. Other embodiments may be used, and structural or functional modifications may be made without departing from the scope of the present disclosure. Aspects of the disclosure are capable of other embodiments and of being practiced in various ways. In addition, the terminology used in this disclosure are for the purpose of description and should not be regarded as limiting.

Known techniques for categorizing business data for tax purposes generally use transitional databases or data centers and keyword matching or other rules-based processing. However, a technical problem of depending on rules alone is that accuracy of the database or matching rules may decrease over time because they lack the ability to adapt quickly to changing trends based on updates to relevant influences, such as changing tax laws or company structure or status. Another technical problem is that use of only hard-coded rules is limited to the categorizations provided by financial or accounting systems or software, which may not be able to accurately identify an expense category for a given expenditure based on rules alone. For example, small and large companies may categorize similar transactions differently.

The systems and methods described herein provide a technical solution to the above problems. Specifically, the technical solution includes automatic analysis and categorization of transactions using one or more of manual labeling, rules-based processing, and artificial intelligence (AI), such as machine learning (ML) or a neural network formed generative AI. An AI model can be trained on anonymized and/or synthetic transaction data. The AI model may be trained to evaluate a transaction and then identify the transaction as a capital allowance or general expenditure. The training data may be received in several ways including, but not limited to, from accounting systems, accountants, financial institution databases, governmental databases, data vendors, etc. Using the AI model, transactions may be categorized according to their data type and nature. In addition, the AI model can be trained to automatically recognize changes to categorizations due to changes in tax laws or company structure or status. In fact, the AI model can actively perform internet searches for updated tax laws following an automated prompt, and the information retrieved from the searches can be used to update the AI model itself.

The methods, systems, and computer-readable media thus offer several benefits. In particular, the methods, systems, and computer-readable media use one or more AI models to reduce analysis and classification time for large accounting datasets. The methods, systems, and computer-readable media represent an improvement to an existing technology or technologies, specifically technologies for using pre-trained AI models, separately or in conjunction with manual input or a rules engine, to classify large datasets of accounting data of varying type and quality. Technologies do not currently exist for concurrently classifying data by AI and manual and/or a rules engine. The methods, systems, and computer-readable media therefore do not merely recite the performance of some business practice known from the pre-computer world along with the requirement to perform it on a computer. Rather, the methods, systems, and computer-readable media incorporate AI models, whether generative AI or machine learning, to enable use of new or custom data, including aggregated or synthetic comparative data. Thus, the systems, methods, and computer-readable media are necessarily rooted in computer technology to overcome a problem specific to classification via rules engines (namely slow speed and varying accuracy due to contras). In addition, the present disclosure includes specific features other than what is well-understood, routine, convention activity in the field, or adding unconventional steps that confine the claim to a particular useful application, e.g., parallelizing AI analysis of tax datasets with manual and/or rules-based analysis, as described herein.

The systems and methods described here may provide transaction categorization through one or more methods based on the type of data and the transaction details, with the method or methods being user selected or automatic based on data type or another factor. Using one or more methods improves the speed and accuracy with which computer recognize and categorize business transactions, especially eclectic expenses and small expenses, such as local shops and non-chain retailers such as boutique retailers, local restaurants, etc. Systems and methods described here may enable analysts or business themselves to categorize transactions with better accuracy and in much higher volume than could a human. Thus, implementations improve the speed and accuracy with which computers categorize transactions. AI-based transaction categorization may also include mapping to different tax or legal codes, thus enabling businesses to streamline their tax processes across different jurisdictions and entities. Expense categorization based at least in part on differing tax codes may be helpful for businesses operating across multiple states or countries.

FIG. 1 shows a block diagram of a system 100 for leveraging one or more of manual classification, rules-based classification, or AI-based classification for transaction categorization. The system 100 comprises one or more servers 102, one or more client devices 104, and a database 106 that may store one or more AI models 108, interconnected via a network 110.

A memory 112 of the server 102 may host one or more applications, such as a transaction classification application 114. Application 114 may provide instructions to server 102 allowing server 202 and client device 104 to together perform various actions. Memory 112 may include volatile and nonvolatile, removable and non-removable media implemented in any method or technology for storage of information such as computer-readable instructions, data structures, program modules, or other data. Memory 112 may include one or more physical persistent memory devices and/or one or more non-persistent memory devices.

The client device 104 may access server applications, such as application 114, and/or resources using one or more client applications, such as a web browser or application. A client device 104 may be a mobile device, such as a laptop, smart phone, or tablet, or computing devices, such as a desktop computer or a server.

The database 106 may be configured to maintain, store, retrieve, and update information for the server 102. Further, the database 106 may provide the server 102 with information periodically or upon request. In this regard, the database 106 may be a distributed database capable of storing, maintaining, and updating large volumes of data across clusters of nodes. The database system 106 may provide a variety of databases including, but not limited to, relational databases, hierarchical databases, distributed databases, in-memory databases, flat file databases, XML databases, NoSQL databases, graph databases, and/or a combination of any of these.

Where an AI model is used for transaction classification, the AI model(s) 108 may be trained to identify a tax classification for a transaction. The AI model(s) 108 may be trained using data and/or information stored in any suitable manner, such as a data lake, local attached storage, network attached storage, or data feed via API. For example, training the AI model(s) 108 may comprise determining expense categories for transactions, for example, by analyzing transactional data. The transactional data may comprise information relevant for determining an expense category for the transaction, such as, the type of data being analyzed. Data types that can be analyzed using embodiments of the invention include income tax data, transfer pricing data, indirect tax data, fixed asset data, trade and customs data, and employment tax data. Each of these data types may have a distinct use case. For example, income tax data can be used to determine the nature of expenses in order to calculate book-to-tax adjustments, i.e., to determine whether a given transaction is deductible or non-deductible. Transfer pricing data can be used to segment revenues between business entities based on one or more characteristic to determine tax treatment, e.g., onshore or offshore. Indirect tax data can be used to determine the category of goods and services involved in the transaction to determine its tax eligibility and the appropriate tax rate (e.g., VAT). Fixed asset data can be used to determine the type of asset involved in the transaction to apply the appropriate tax treatment. Trade and customs data can be used to assign HTS codes to products involved in the transaction to determine the appropriate customs charges. Employment tax data can be used to determine the total tax liability for the fringe benefits tax. The client device 104 and/or the server 102 may also create calculated data based on other, previously stored data. For example, a variance type of data can be created to track a difference between the date an order is created and the date the order is shipped. In addition, aggregated data fields can be generated by server 102 wherein a value across an imported file can be tracked. For example, the total amount of a value in every row of a file; effectively this adds a new row to the file for storage in the database system 106. As more and more transactions are subsequently included in the training set, the accuracy of the AI model's transaction classification increases.

In some cases, if there is insufficient training data or the transaction data does not include suitable information for the AI model(s) 108, the transaction classification may vary, and it may not be possible to provide a high level of confidence. In other words, the transactions related to a specific type of data may not be readily reconcilable to a specific use case or classification. In such cases, synthetic data may be used to further train the AI model(s) 108.

The server 102 may be configured with a server application that is capable of interfacing with the client applications and the database 106. In this regard, the server 102 may be a stand-alone server, a corporate server, or a server located in a server farm or cloud-computer environment. According to some examples, the server system may be a virtual server hosted on hardware capable of supporting a plurality of virtual servers.

Regarding the network 110, it should be noted that the network connections shown are illustrative and any means of establishing a communications link between the computers may be used. The existence of any of various network protocols such as TCP/IP, Ethernet, File Transfer Protocol (FTP) or Secure FTP (SFTP), HTTP and the like, and of various wireless communication technologies such as GSM, CDMA, Wi-Fi, LTE, and 5G is presumed, and the various computing devices described herein may be configured to communicate using any of these network protocols or technologies. Any of these devices and systems may be implemented, in whole or in part, using one or more computing systems described below and illustrated by FIG. 2.

Moreover, the network 110 may include any type of network. For example, the network 110 may include a local area network (LAN), a wide area network (WAN), a wireless telecommunications network, and/or any other communication network or combination. It will be appreciated that the network connections shown are illustrative and any means of establishing a communications link between the computers may be used. The existence of any of various network protocols such as TCP/IP, Ethernet, FTP, SFTP, HTTP and the like, and of various wireless communication technologies such as GSM, CDMA, Wi-Fi, LTE, and 5G, is presumed, and the various computing devices described herein may be configured to communicate using any of these network protocols or technologies.

The data transferred to and from various computing devices in system 100 may include secure and sensitive data, such as confidential documents, client personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, FTP, SFTP, and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
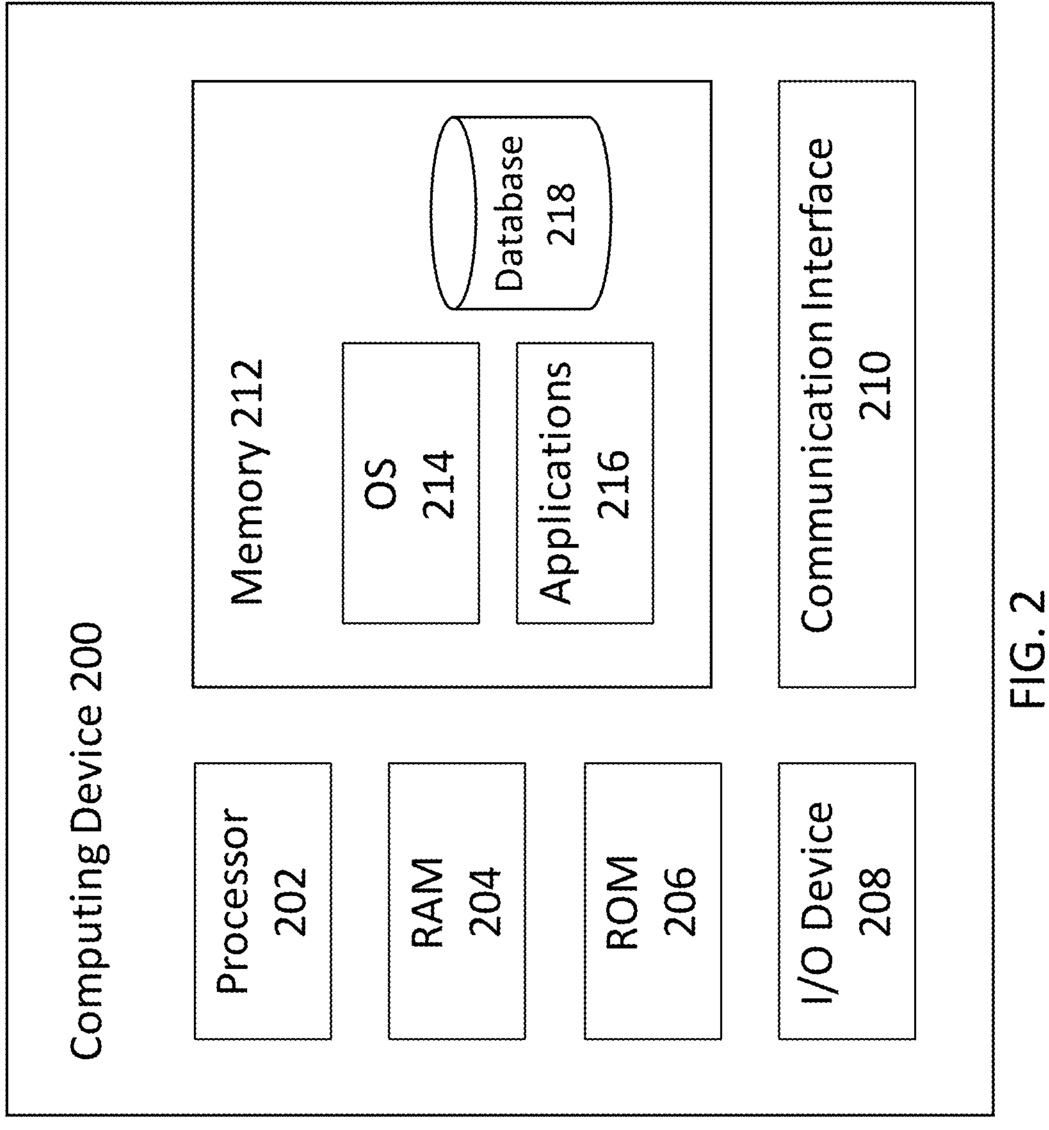
FIG. 2 is a block diagram illustrating a computing device that may be used with the system described in FIG. 1.

FIG. 2 is a block diagram illustrating a computing device 200 that may be used with the server 102 and/or the client device 104 described in FIG. 1. The computing device 200 may include one or more processors 202 for controlling overall operation of the computing device 200 and its associated components, including RAM 204, ROM 206, input/output device 208, communication interface 210, and/or memory 212. A data bus may interconnect processor 202, RAM 204, ROM 206, memory 212, I/O device 208, and/or communication interface 210. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

The I/O device 208 may include a microphone, keypad, touch screen, and/or stylus through which a user of the computing device 200 may provide input and may also include one or more of a speaker for providing audio output and a video display device for providing textual, audiovisual, and/or graphical output. Software may be stored within a memory 212 to provide instructions to processor 202 allowing computing device 200 to perform various actions. For example, memory 212 may store software used by the computing device 200, such as an operating system (OS) 214, application programs 216, and/or an associated internal database 218. An example of the application programs 216 storable by memory 212 is the transaction classification application 114 of FIG. 1. The various hardware memory units in memory 212 may include volatile and nonvolatile, removable and non-removable media implemented in any method or technology for storage of information such as computer-readable instructions, data structures, program modules, or other data. The memory 212 may include one or more physical persistent memory devices and/or one or more non-persistent memory devices. In some embodiments, RAM 204 and/or ROM 206 may be part of the memory 212 along with electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 202.

The communication interface 210 may include one or more transceivers, digital signal processors, and/or additional circuitry and software for communicating via any network, wired or wireless, using any protocol as described above.

The processor 202 may include a single central processing unit (CPU), which may be a single-core or multi-core processor or may include multiple CPUs. Processor 202 and associated components may allow the computing device 200 to execute a series of computer-readable instructions to perform some or all of the processes described herein. Although not shown in FIG. 2, various elements within memory 212 or other components in computing device 200, may include one or more caches, for example, CPU caches used by the processor 202, page caches used by the OS 214, disk caches of a hard drive, and/or database caches used to cache content from the database 218. For embodiments including a CPU cache, the CPU cache may be used by one or more processors 202 to reduce memory latency and access time. A processor 202 may retrieve data from or write data to the CPU cache rather than reading/writing to memory 212, which may improve the speed of these operations. In some examples, a database cache may be created in which certain data from a database 218 is cached in a separate smaller database in a memory separate from the database, such as in RAM 204 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
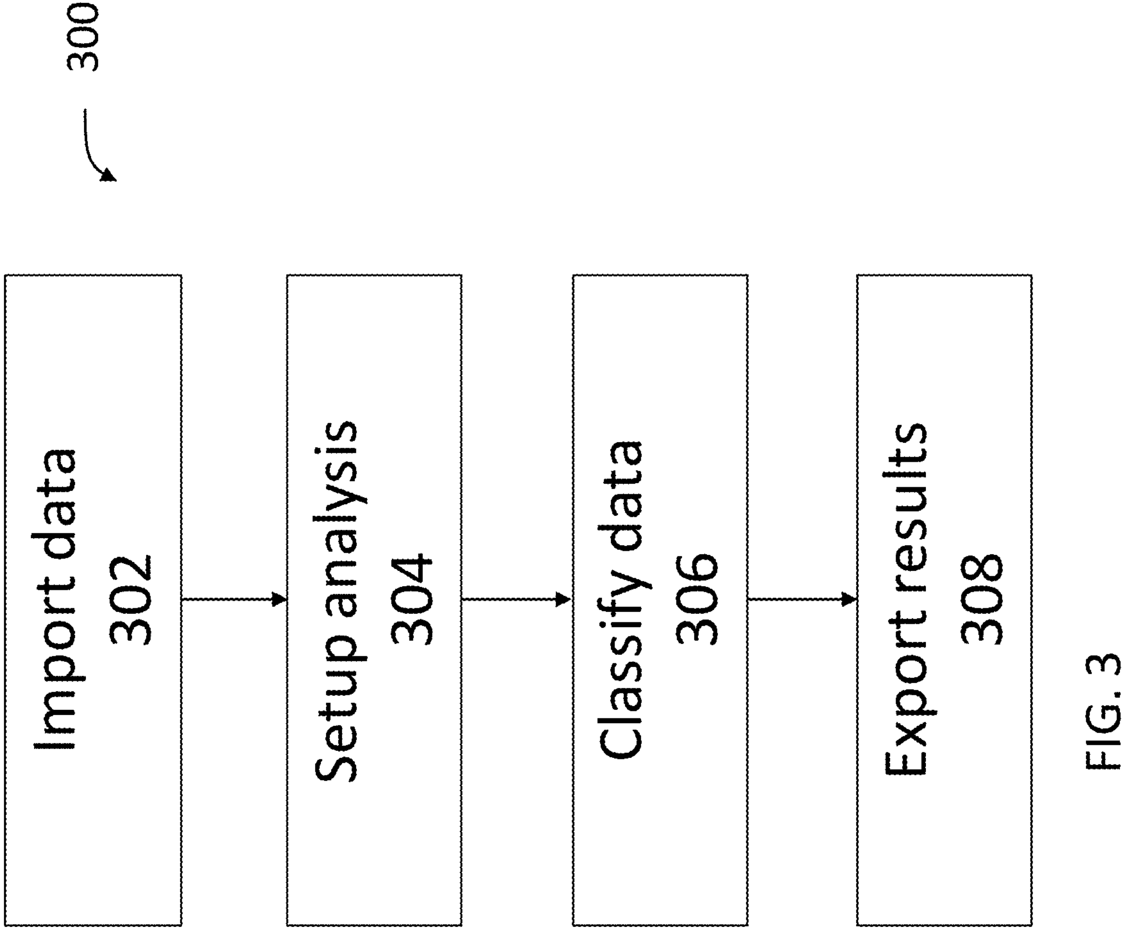
FIG. 3 is a flowchart illustrating an example method for intelligent transaction analytics using the system of FIG. 1.

FIG. 3 is a flowchart illustrating an example method 300 for intelligent transaction analytics using the system 100 of FIG. 1. The first step is to import data 302, which can also include identifying data already in a database, such as database 106 (shown in FIG. 1). When the data is imported, the next step is to setup an analysis 304. An analysis can be done using rules-based processing, or one or more AI models, such as AI models 108 (shown in FIG. 1), or using both rules-based processing and one or more AI models. If using rules-based processing, regardless of whether AI model(s) 108 is used, the setup step also includes creating a set of classification rules, using an analysis template having previously created rules, or using an existing analysis as the basis for the new analysis. An example rule is one that uses a custom field. For example, a custom field could be a variance field that tracks the difference between an order date and a shipment date. The rule could be created that flags an entry where the order amount violates a threshold (greater than 100 units or less than 10 units, for example) and where the variance violates a threshold (greater than 10 days, for example). Another example rule uses a calculated aggregate custom field as described above. For example, server 102 can calculate an aggregated value across an entire file (by, e.g., adding all values of a specific row together) and the compare each value in that row against the aggregate to determine if the value violates a threshold (greater than or less than a specific percentage, for example).

The next step is to classify the transaction data 306 using the chosen method or methods. The results are then exported 308 for review where a user can manually update the results then upload the updated results back into system 100 to update database 106. Alternatively, the user can manually update the results directly within the UI of the application 114. The following figures will describe the steps of method 300 in greater detail. As another alternative, the AI model 108 may automatically update the results, whether prompted by the user or following a predefined script.

Figure 4:
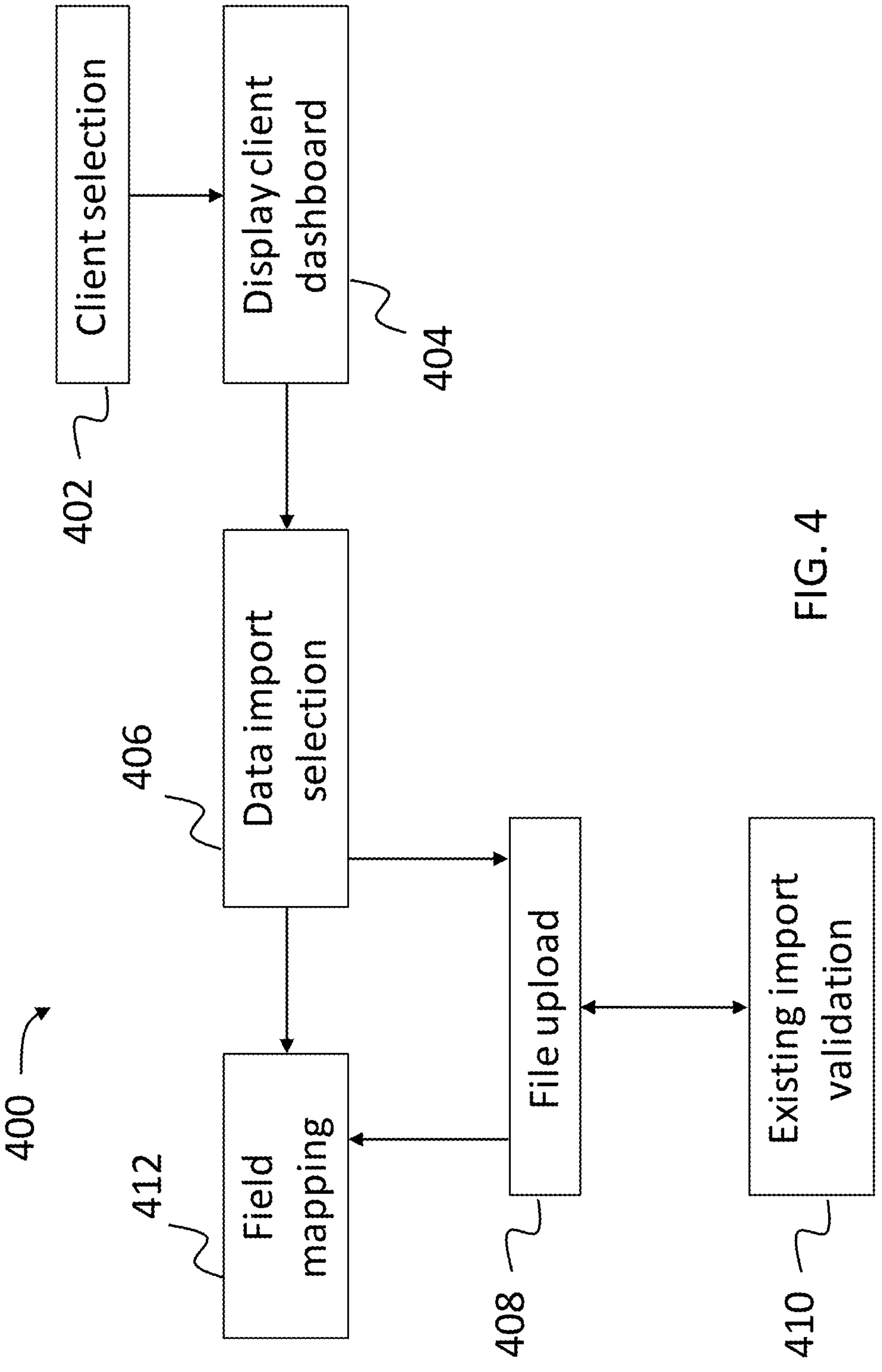
FIG. 4 is a flowchart illustrating an example method to import data for analysis using the system of FIG. 1.

FIG. 4 is a flowchart illustrating an example method to import data for analysis 400 using the system 100 of FIG. 1. A user selects 402 a client. The user may select the client through a direct access URL from client device 104 accessing the server 102 and database 106. Alternatively, the user may select the client from a dropdown menu within an application, such as application 114, or by accessing the application 114 where access to other clients has been restricted. In an example, the user may select a desired client using application 114. In response to the client selection, the system 100 provides 404 client dashboards to the user via application 114. The client dashboard may include a list of existing reviews in their various states, overview visuals of the client engagement, and data analytics. The items shown in the client dashboard may be limited to specific entities within the client according to the user role.

The user then selects 406 to import data, which can be done either through the client device 104 via application 114 or by direct upload via URL. If through the application 114, imported data can be pushed or pulled from the database 106. If through a URL, such as where the user has an external dataset to use, the user uploads 408 one or more files, which can be CSV files, Excel files, XML files, JSON files, or any other suitable format. The imported data can be related to one or more entities of the selected client but can only relate to a single client and not multiple clients. The uploaded data can include any transaction data as shown in Table 1 below, as well as data not listed but that may be used for tax analyses.

TABLE 1

| Data Type | Use Case |
|---|---|
| Income Tax | Determine the nature of expenses to calculate book-to-tax adjustments (i.e., deductible vs. non-deductible) |
| Transfer Pricing | Segment revenues based on a particular characteristic to determine tax treatment (e.g., onshore vs. offshore) |
| Indirect Tax | Determine the category of goods and services to determine its tax eligibility and the appropriate tax rate (e.g., VAT) |
| Fixed Assets | Determine the type of asset to apply the appropriate tax treatment |
| Trade & Customs | Assign HTS codes to products to determine the appropriate customs charges |
| Employment Tax | Classify employee benefits to determine the total tax liability for the fringe benefits tax |

System 100, generally using the server 102, then validates 410 the imported data and maps 412 fields within the imported data. Field mapping can be done in an automated fashion using intelligent tagging techniques. Alternatively, if the data fields have been previously used, a template including standard fields can be used. The user may also create their own tags to manually map the data. Further, fields may be mapped according to the type of data. More specifically, data is validated according to its type (see Table 1 above for examples) and mapped to a type when possible. The user can then, via application 114 (shown in FIG. 2), do additional mapping of data to type and/or edits the results of the initial mapping done by the application 114. The initial mapping techniques can vary but, in an embodiment, includes number formats for various regions (e.g., commas vs. decimals in the United States vs. the European Union), data formats where intelligent selections are made available (e.g., "yyyymmdd" vs. "yyyyddmm" if the data presents as "20200505"), and recognition of column headers in uploaded or imported data as described above. The column headers may be recognized relative to pre-tagged columns for a given data type. For example, application 114 or elsewhere on system 100 may identify a "Tax Adjustment" column as one required for an income tax dataset.

Figure 5:
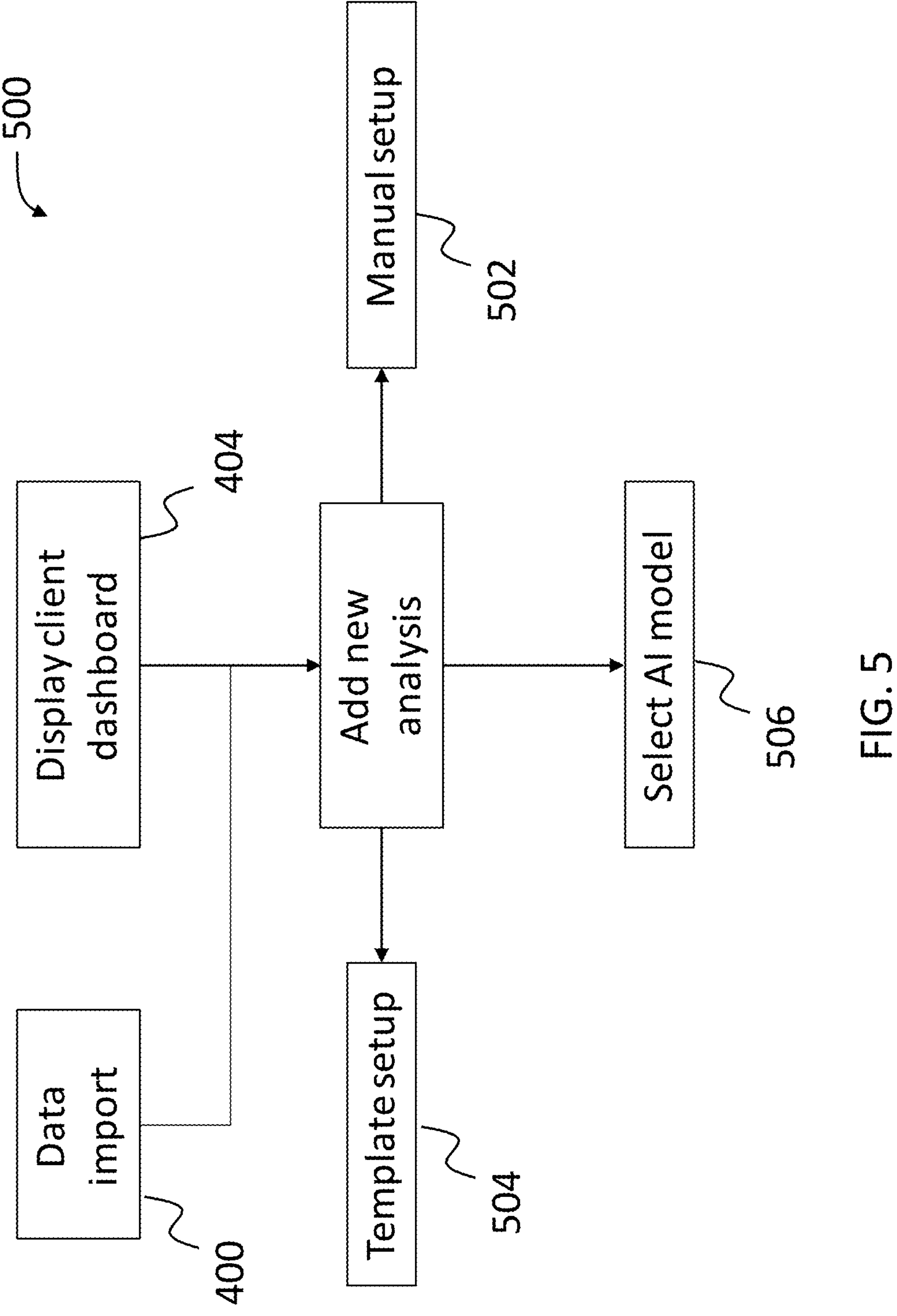
FIG. 5 is a flowchart illustrating an example method to set up a data analysis using the system of FIG. 1.

FIG. 5 is a flowchart illustrating an example method to set up a data analysis 500 using the system 100 of FIG. 1. An analysis can be setup either from the client dashboard displayed 404 in the application 114 (shown in FIG. 2) or from the result of the data import method 400 shown in FIG. 4. The setup can be manual, created from a template, or by designating an AI model to use. The analysis type can be selected by the user through application 114, for example. Moreover, all setups can be done through the application 114 with templates being stored within the database 106 for later retrieval. Analyses may also be versioned for comparison against previous versions. Bulk analyses may also be created by, for example, selecting multiple existing analyses and creating new versions of those analyses based on new data.

If an analysis is setup manually 502, the user is required to provide the client entity or entities to evaluate, the type of analysis to conduct, possible classification buckets and field identifications, and how contras are to be handled. If an analysis is setup via template 504, the user can select an existing template, a continuation of an earlier analysis (e.g., if data has been added to facilitate more analysis for the same entity) or create a new template. New templates can differ by analysis type, for example. If an analysis is setup by selecting an AI model 506, the user can designate a desired model out of available pre-trained models. An AI model 108 can be used in lieu of creating rules or in conjunction to validate the confidence in the results from the rules-based analysis.

Figure 6:
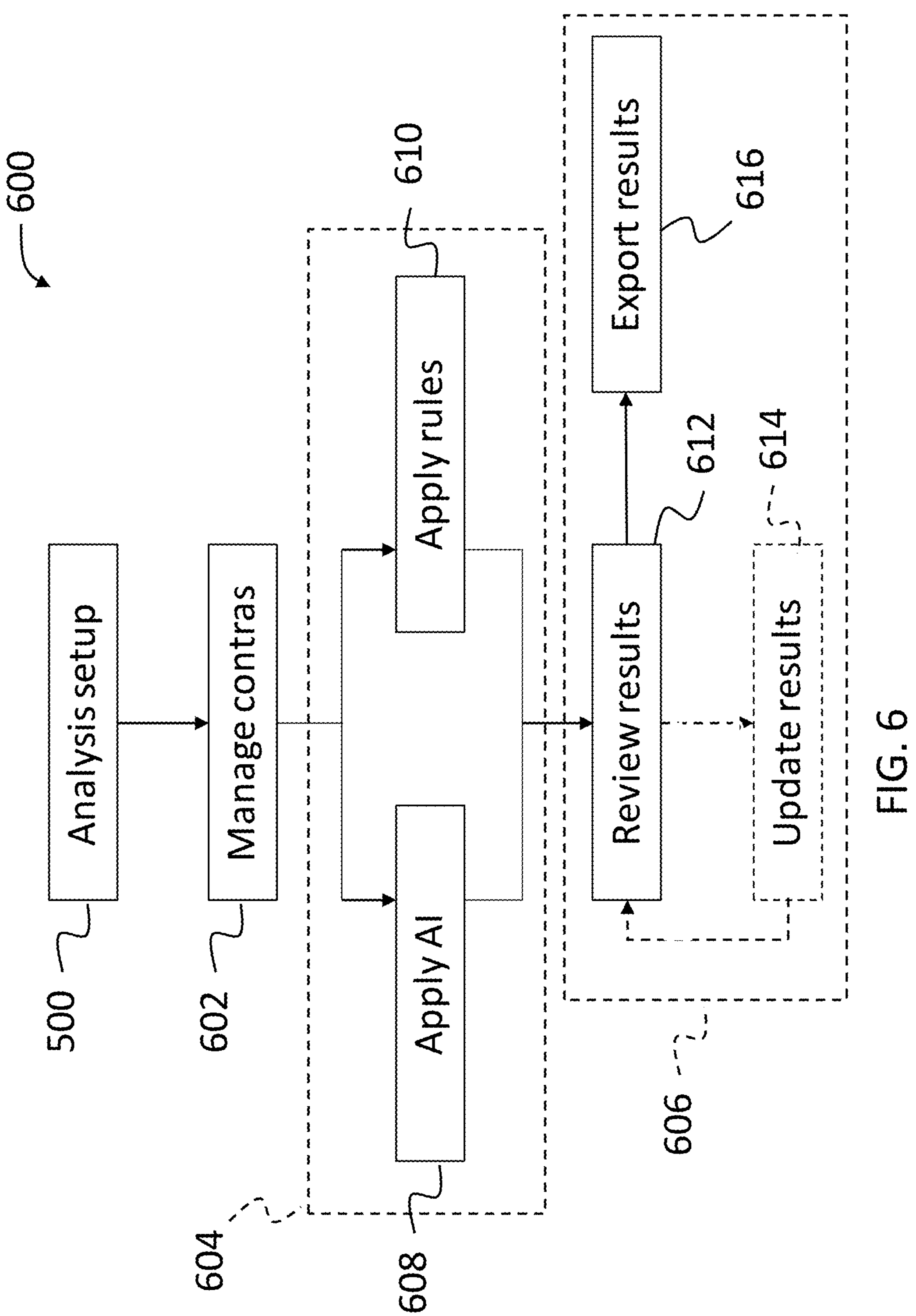
FIG. 6 is a flowchart illustrating an example method of running a data analysis using the system of FIG. 1.

FIG. 6 is a flowchart illustrating an example method of running a data analysis 600 using the system 100 of FIG. 1. After an analysis is setup 500, it has three main stages: (1) managing contras 602; (2) an application stage 604 that includes applying the selected AI model and/or the configured rules; and (3) a review stage 606 including reviewing, updating, and exporting the results. In some embodiments, the user can designate the AI model to conduct an initial analysis of the data to classify the transactions followed by a second analysis by the rules as setup below. Alternatively, the user can designate that the rules as setup below to conduct the initially analysis of the data followed by a second analysis by the AI model.

In stage one, contras are reviewed and managed 602. Transactions identified as contras are presented to the user in groupings that create the contra. Users can review and add any misidentified contras back into the analysis. Contras, as noted above, are transactional records when a debit and a credit affect the same parent account, resulting in a net zero effect to the account. For example, where a debit from an account and a credit to the same account have the same value and similar purpose, they result in a net zero effect to the account. In some embodiments, an AI model can be used to analyze the contras separately from the greater analysis to determine where contras are misidentified so they can be added back into the analysis. Contras can also be used to automatically correct uploaded or newly created data. For example, when contras are identified and managed (i.e., fixed such that an analysis does not result in improper output from what would be a net zero effect), the type of contra can be stored such that, when a later analysis is started, the application 114 would automatically recognize and fix the contra in a different set of data.

The actions taken by the system 100 in stage two depend on the type of analysis to be run. If the analysis is to be run 608 using an AI model, it is triggered upon its selection or upon a follow-on user command to begin. For example, the user can select from a pre-determined set of AI models, each purpose built for the type of analysis needed (i.e., each trained on a specific type or types of data as described in Table 1 above).

If the analysis is to be run using rules 610, the user will be prompted by the client device 104 and application 114 to create rules, resolve rule conflicts, and manage the rules. Rules can be "simple" or "advanced." For simple rules, keywords are extracted from the data and presented to the user via application 114 based on the selection of fields that can make up keywords (e.g., pulling from the Product Description column could be table, or chair whereas pulling from the Profit Center column could be 123-AB, or 342-FE). These items can be dragged into a classification bucket within the application 114 to generate the simple rule on the items' classification. Advanced rules can be created using a query builder interface within the application 114 that allows for the generation of SQL statements. These can also be dragged into a classification bucket within the application 114. Once they are created, application 114 stores the rules in the database 106. The user may also save the rules construction as a new template if desired, and application 114 stores the template in the database 106 accordingly.

Rules as originally constructed may be in conflict. For example, when one rule says amounts greater than 500 go to classification A and another says keyword "Apple" goes to classification B. A record for "Apple" with a quantity of 1000 would be in conflict. Such conflicts can be resolved in two manners. First, rules can be prioritized within the application 114 to indicate which rule would "win." Second, those transactions in conflict due to the rules can be manually classified within the application 114 by the user. Rules can also be managed within the application 114 and stored to the database 106. For example, rules can be managed by editing rule queries, changing rule classifications, changing rule priorities, or deleting rules. An example rule query is when a rule looks for amounts greater than 500 on a given transaction to classify that transaction as classification A, as described above. That query could be changed to amounts greater than 1000, for example. An example rule classification is that amount greater than 500 be marked as classification A. The classification could be changed such that amounts greater than 500 are marked as classification C.

The system 100 uses a level of prioritization whereby the ultimate classified value of an item is based on the selection made at the highest priority. In an embodiment of the invention, that priority from top to bottom is (1) manual user entry or override via application 114; (2) rules based on the specific rule priority level as set above; and (3) as defined in the AI model 108 selected for the analysis.

After the rules are setup and the analysis is run in stage two 604, the application 114 proceeds to stage three 606 in which the application 114 displays 612 for the user a summary chart of the transaction classifications and methods used. The user can manually adjust or update 614 (i.e., override) line-item classifications either individually or in bulk. Alternatively, if classification is done manually outside of the tool, the user can upload those results and apply them. Alternatively, and where an AI model is used, the user can choose which classification type to use-done by rules, done by AI, or done manually or a combination thereof. When the user selects an AI model to perform the analysis, the analysis results presented to the user via application 114 indicate how the transaction data has been pre-classified based on the AI model chosen and includes a level of confidence in the result. In at least some embodiments, results from a rule would then supersede those from an AI model and a manual classification would supersede rules. All potential determinations are tracked in the system 100 (e.g., in database 106) and the final classification is provided.

When the analysis is complete and the results have been reviewed 612 and updated 614, the classification results can be exported 616 via application 114 by, for example, downloading as a file to the client device 104 and/or by pushing the results to the database 106. Downloads can be in various formats including CSV, XLS, JSON, XML, or other machine-readable formats. Reports can include results for a single analysis or multiple analyses. A report can also include a summary and/or a breakdown of which transactions were classified according to which rules. The results may also be pushed back to the database 106 for aggregation and may be used to further train AI models for later analyses.

The method and systems described herein provide and enable businesses to categorize transactions with an accuracy close to what it would be using an accountant and at a significantly lower cost than using an accountant. Thus, implementations improve the speed and accuracy with which computers categorize business expenses. Additionally, mapping the business profile would provide better quality of results. With multiple methods of categorization via, for example, manual user classifications, rules-based processing, and machine learning, as well as user adjustments, the process may be streamlined for multiple verifications in order to improve the accuracy of recording the expenditure for reporting, taxation, and other legal purposes. The training of the AI model may enhance the alignment of the mixed process classification systems based on the business profile and past transaction activity. Additional AI models may be implemented for converting stored transactional data into synthetic data prior to extraction of the data from the database.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A computer-implemented method for classification of business transactions, executed by a transaction classification application operating on a client device communicatively coupled to a server via a network, the method comprising:

receiving, by the application, identification of a dataset including a plurality of transactions including one or more tax-related data types;

validating and mapping, by the application, the dataset to one or more fields using intelligent tagging techniques or templates stored in a database;

creating an analysis by receiving, via the application, an identification of an existing template stored in the database for use in the analysis and/or receiving, via the application, details of a new template for use in the analysis, the new template being stored in the database for subsequent analyses, and wherein the template specifies a field mapping schema and one or more rule priority levels, and wherein validating and mapping comprises normalizing the dataset into a canonical transaction table according to the field mapping schema;

receiving, via the application, a user selection of an AI model from among a plurality of pre-trained models stored in the database;

loading parameters of the selected AI model and generating, for each transaction, an AI-based classification label and confidence value;

classifying the transactions by applying:

a rules engine configured to apply classification rules and resolve rule conflicts;

manual user inputs provided via an interactive interface of the application; and the selected AI model trained on anonymized and synthetic transaction data, the model being updated based on changes in tax laws or business structures;

managing contras by:

identifying transaction pairs that offset each other as contras and presenting the identified contras to a user via the client device for review;

receiving, via the application, a user selection of a first transaction within a contra pair to retain for the analysis and discarding a second transaction within the contra pair; and storing a contra signature for each reviewed contra pair and, for subsequently received datasets, matching transactions to stored contra signatures and automatically flagging matched transactions for exclusion from at least one aggregate calculation; and exporting the classified transactions in a machine-readable format for storage in the database or for downstream tax analysis, wherein the selected AI model is trained to distinguish between different data types and classification types based on anonymized and synthetic transaction data.

2. The computer-implemented method of claim 1, wherein receiving identification of a dataset comprises receiving a direct upload of the dataset via a uniform resource locator (URL) through the application.

3. The computer-implemented method of claim 1, wherein mapping the dataset to one or more fields comprises using manually created fields and one or more templates including predefined standard fields stored in the database.

4. The computer-implemented method of claim 1, wherein classifying the transactions further comprises receiving, via the application, a user-defined prioritization of manual classification, rules-based classification, and AI classification when conflicts occur.

5. The computer-implemented method of claim 1, further comprising training the AI model to distinguish between different data types and classification types based on anonymized and synthetic transaction data.

6. A distributed computing system for intelligent classification of business transactions, comprising:

one or more servers configured with a transaction classification application and a database storing a plurality of artificial intelligence (AI) models, each AI model being purpose-built for a type of analysis and trained using anonymized and synthetic transaction data; and one or more client devices communicatively coupled to the servers via a secure network, the client devices configured to provide user inputs and display classification results through an interactive graphical interface, wherein the one or more servers are further configured to:

validate and map imported transaction datasets using intelligent tagging techniques and predefined templates stored in the database, wherein the intelligent tagging techniques recognize region-specific number formats, date formats, and column headers relative to pre-tagged columns for a selected data type;

receive, via the interactive graphical interface, user inputs to create an analysis by:

extracting keywords from selected fields of the dataset and generating one or more rules-based classifications based on the extracted keywords using classification buckets;

generating one or more advanced rules using a query builder interface that generates database query statements;

validating the query statements against a database schema corresponding to the predefined fields; and storing the created rules and compiled queries in the database with rule priority levels;

receive, via the interactive graphical interface, a user selection of an AI model from among the plurality of AI models;

execute concurrent classification of transactions using:

a rules engine configured to apply the stored classification rules and resolve rule conflicts;

manual user overrides received via the one or more client devices; and the selected AI model;

determine, for each transaction, an ultimate classified value by:

applying a priority order in which a manual user entry or override supersedes the rules engine based on the rule priority levels and the selected AI model; and tracking in the database the AI-based determination, the rules-based determination, and the manual determination for the transaction;

manage contras by:

detecting transaction pairs that offset each other, presenting identified contras to a user via the client device for review, and using the selected AI model to determine where contras are misidentified; and storing details of contra pairs such that subsequent analyses automatically recognize and fix corresponding contra pairs in subsequently received datasets; and export classification results in a structured machine-readable format by downloading results to the client device and/or pushing results to the database, wherein exported results include a breakdown indicating which transactions were classified according to which rules and wherein transaction data transmitted between the client devices and the servers is protected using secure network protocols and encryption.

7. A computer-implemented method executed by one or more server processors for classification of business transactions, the method comprising:

receiving, at the server, a dataset including a plurality of transactions of different tax-related data types from a client device via a secure network connection;

validating and mapping, by the server, data within the dataset to predefined fields using intelligent tagging algorithms and templates stored in a database accessible to the server, wherein the intelligent tagging algorithms recognize region-specific number formats, date formats, and column headers relative to pre-tagged columns for a selected data type;

receiving, at the server via an application operating on the client device, user inputs to create an analysis by:

extracting keywords from selected fields of the dataset and generating rules by assigning extracted keywords to classification buckets via the application;

generating advanced rules using a query builder interface that generates database query statements validated against the mapped predefined fields; and storing the rules and compiled queries in the database with rule priority levels;

receiving, at the server via the application, a user selection of an artificial intelligence (AI) model from among a predetermined set of AI models stored in the database, each AI model being purpose-built for a type of analysis and trained using anonymized and synthetic transaction data;

classifying, by the server, transactions in the dataset by:

applying the selected AI model hosted on the server, the model being trained on anonymized and synthetic transaction data and dynamically updated based on changes in tax laws retrieved through automated network queries to generate an AI-based classification determination and an associated confidence value for a transaction;

applying one or more stored rules via a rules engine to generate a rules-based classification determination for the transaction;

receiving, via the application, a manual user classification determination for the transaction; and resolving conflicts among the AI-based, rules-based, and manual determinations according to a priority order in which a manual user entry or override supersedes the rules-based determination based on the rule priority levels and the AI-based determination;

tracking, in the database, the AI-based determination, the rules-based determination, and the manual determination for each transaction and storing a final classification determination;

managing by:

detecting transaction pairs in which a debit and a credit affect the same parent account and result in a net-zero effect;

presenting identified contra pairs to a user via the client device for review;

using the selected AI model to analyze the contra pairs to determine where contras are misidentified and to correct uploaded or newly created data; and storing details of contra types and relationships in the database such that subsequent analyses automatically recognize and fix corresponding contra pairs in subsequently received datasets;

exporting classification results by downloading results to the client device via an interactive graphical interface and/or pushing results to the database in a machine-readable format, wherein exported results include a breakdown indicating which transactions were classified according to which rules; and pushing the classified dataset to the database for aggregation and further unsupervised training of the selected AI model, wherein transaction data transmitted between the client device and the server is protected using secure network protocols and encryption.

* * * * *